Oct. 20, 1959  E. W. S. NICHOLSON  2,909,478
HEAT EXCHANGE SYSTEM FOR THE PRODUCTS AND REACTANTS
IN THE REFORMING OF GASOLINE
Filed Dec. 26, 1952
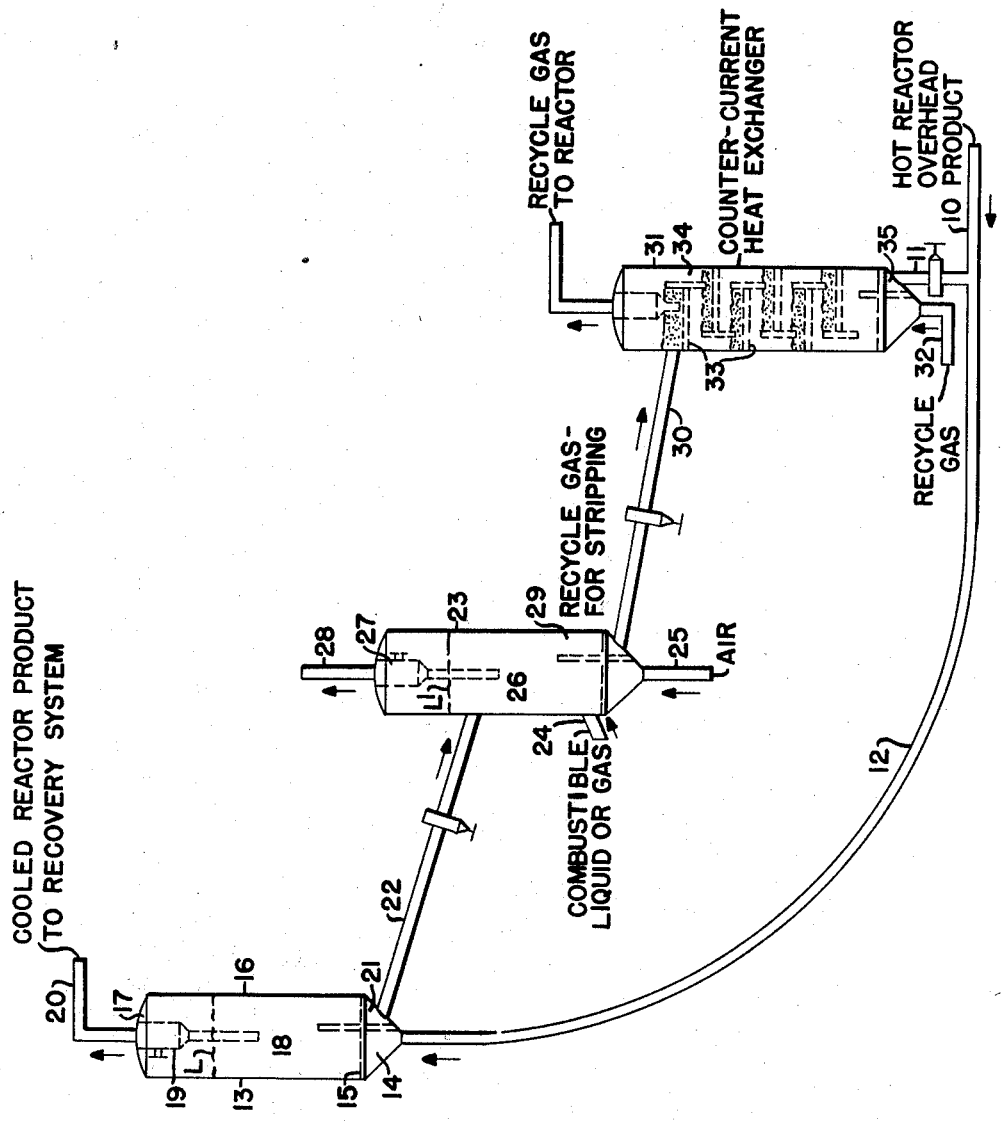
Edward W. S. Nicholson Inventor
By H. M. Feyrer Attorney United States Patent Office 2,909,478
Patented Oct. 20, 1959

2,909,478

HEAT EXCHANGE SYSTEM FOR THE PRODUCTS AND REACTANTS IN THE REFORMING OF GASOLINE

Edward W. S. Nicholson, Baton Rouge, La., assignor to Esso Research and Engineering Company, a corporation of Delaware Application December 26, 1952, Serial No. 328,019

6 Claims. (Cl. 208—95)

This invention pertains to a heat recovery system and particularly to a heat recovery system that is especially adapted for use in a hydroforming reaction system.

Hydroforming is a well-known process for treating hydrocarbon fractions boiling within the motor fuel or naphtha range to upgrade the same or increase the aromaticity and improve the anti-knock characteristics of said hydrocarbon fractions. By hydroforming is meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are ordinarily carried out in the presence of hydrogen or hydrogen-rich recycle gas at temperatures of 750–1150° F. in the pressure range of about 50–1000 lbs. per sq. inch and in contact with such catalysts as molybdenum oxide, chromium oxide, or, in general, oxides of sulfides of metals of groups IV, V, VI, VII and VIII of the periodic system of elements, alone, or generally supported on a base or spacing agent such as alumina gel, precipitated alumina or zinc aluminate spinel.

In hydroforming, the dehydrogenation of naphthenes and, to a smaller degree, the cracking and cyclization of paraffins are highly endothermic reactions. Hydrogenation of the olefins formed by cracking is an exothermic reaction and offsets the heat requirements for the first named reactions to a minor extent. The heat of reaction depends somewhat upon the amount of hydrogen formed in the reaction and increases, for example, from about 100 B.t.u. per lb. of feed when producing about 200–250 cu. ft. of hydrogen per barrel of feed to about 250 B.t.u. per lb. of feed when producing about 800 cu. ft. of hydrogen per barrel of feed.

The heat of reaction is supplied by preheating the feed stock to or above reaction temperature, by preheating the hydrogen-rich recycle gas circulated through the reaction zone to temperatures two to three hundred degrees above reaction temperature, by heating the walls of the reaction zone and, in the case of fluidized solids operation by recycling regenerated catalyst at or near regeneration temperature to the reaction zone. Of these methods, preheating of recycle gas is generally used to supply the major proportion of the heat of reaction. However, in order to prepare recycle gas which is suitable for preheating to temperatures of 1200–1250° F., it is necessary to cool the reaction products and the accompanying diluent and make gas to temperatures of about 80–120° F. In order to utilize the sensible heat in the reaction products stream, it has been proposed to pass the reaction products in indirect heat exchange relation to the naptha feed and/or the recycle gas.

It is the object of this invention to provide an improved method for recovering heat from a hydrocarbon reaction products stream.

It is also the object of this invention to provide a heat recovery system which is particularly adapted for use in hydroforming reaction systems.

It is also a further object of this invention to provide an improved method for recovering heat from a hydroforming reaction products stream and transferring the same to a recycle gas stream supplied to the reaction zone. These and other objects will appear more clearly from the detailed specification and claims which follow.

It has now been found that maximum heat recovery from the reactor overhead stream may be obtained through the use of a series of fluidized solids heat exchangers. The heat exchanger solids are used first to cool the reaction products stream to a temperature not lower than its dew point, whereupon the solids are heated by direct or indirect heat exchange to about 1200° F. or higher and then used to heat the recycle gas stream to that temperature in a countercurrent staged exchanger. Clay, sand, metal shot or other inert material may be used as the heat exchanger solids. Since the heaviest constituents in the product stream are often removed or separated from the reaction products, they may be allowed to deposit or collect upon the heat exchange solids in the initial contacting or product cooling zone whereupon said deposits can be burned off in the second or heating zone in order to heat the solids preparatory to supplying the solids to the recycle gas heating zone. In this way, objectionable constituents may be removed from the product stream and used to eliminate or minimize the need for extraneous fuel for heating the heat exchange solids. The use of hot solids for heating the recycle gas also eliminates the need for a fired coil for heating the recycle gas stream. This is of particular value in that coking of said fired coils has presented a problem. Deposition of coke on the heat exchange solids in the recycle gas heater is not objectionable in the present invention since such coke is carried over to the heating zone and burned therein. If it is desired to avoid compressing air up to system pressure, heating of the heat transfer solids may be carried out in indirect heat exchange relation to a furnace or directly fired bed of fluidized solids that is substantially at atmospheric pressure.

Reference is made to the accompanying drawing illustrating a diagrammatic flow-plan of one embodiment of the present invention.

In the drawing, 10 is a conduit through which reactor overhead product is supplied at substantially reactor temperature of about 900° F. and at reactor system pressure of up to about 500 lbs. per sq. inch. Relatively cold heat exchange solids such as sand, clay, metal shot or the like are discharged from line 11 into line 10 where these solids are picked up and carried along by the hot reactor overhead product. Since it is normally desirable to quench or reduce the temperature of the reaction products promptly, it is desirable to keep the length of the products outlet line 10 or the distance between the reactor outlet and the line for the introduction of the heat exchanger solids as short as possible. The mixture of reaction products and heat transfer solids passes through transfer line 12 to heads tank 13. Although an equilibrium temperature is generally reached in a few seconds or in the normal residence time of the mixture in the transfer line 12, the heads tank 13 can be designed to give sufficient holding time to bring the reaction products down to the desired temperature. The heads tank 13 comprises an inverted conical inlet chamber 14, a distributor plate or grid 15, a cylindrical body section 16 and a dome-shaped top section 17. The velocity of the vaporous reaction products through heads tank 13 is so controlled as to form a dense, fluidized bed 18 of heat exchanger solids having a definite level L. The reaction products pass overhead through a cyclone separator 19 and products outlet line 20 to suitable products recovery, stabilizing and storage equipment.

Heat exchanger solids at equilibrium temperature pass into withdrawal well 21 in the lower portion of the heads tank 13 from where the solid particles pass through transfer line 22 into heating chamber 23. Extraneous liquid or gaseous fuel is supplied to heating chamber 23 through inlet line 24 and air is supplied through line 25 to burn said extraneous fuel as well as any combustible material deposited on or entrained with the heat exchanger solids. The velocity of the gases through chamber 23 is so controlled as to form a dense, fluidized bed 26 having a definite level L'. Combustion gases pass overhead from dense bed 26 through a cyclone separator 27 or the like for separating entrained solid particles which are returned to the dense bed 26 while the combuston gases pass through line 28 to a flue or waste gas stack.

The heat exchanger solids are heated to the desired temperature by control of the supply of extraneous fuel and the hot solids pass from dense bed 26 into withdrawal well 29 arranged in the lower portion of the heater vessel 23. Ordinarily it is preferable to rid the hot heat exchanger solids of any oxygen or carbon oxides and accordingly a suitable stripping gas is supplied to the bottom of the withdrawal well to purge the solids of these gases. Recycle gas or excess gas from the hydroforming process may be used for this stripping operation and may also serve as at least a part of the extraneous fuel for heating the heat exchanger solids.

The stripped, hot heat exchange solids are discharged from withdrawal well 29 via transfer line 30 into countercurrent heat exchanger 31. Recycle gas is supplied through inlet line 32 to the bottom of heat exchanger 31. In order to prevent back-mixing and to insure that the recycle gas is heated to a maximum temperature by countercurrent contact with the heat transfer solids, a plurality of perforated plates 33 are arranged horizontally in the heat exchanger 31. The plates may have openings of sufficient size as to permit the passage of catalyst therethrough or each plate may be provided with a downcomer 34 for the passage of solid particles to the next lower plate. A desirable arrangement is shown in which each downcomer extends above its respective plate thereby maintaining a definite minimum layer of heat exchange solids on each of the plates. The cooled heat exchanger solids are discharged from the lowermost plate in the heat exchanger into withdrawal well 35 from where the solids pass into line 11 for intermixture with fresh reactor overhead product supplied through line 10 and recycling through the heat exchange system.

The operation of the heat exchange system of the present invention is as follows: a hydrocarbon fraction such as a 200–430° F. boiling range naphtha is hydroformed at a temperature of about 900° F. and at a pressure of about 200 lbs. per sq. inch in contact with a catalyst comprising about 10 wt. percent molybdenum oxide on activated alumina. Hydrogen-rich recycle gas is passed through the reaction zone at a rate of about 6000 cu. ft. per barrel of feed. Reaction products are taken overhead from the reaction zone at about 900° F. and mixed in transfer line 12 with sufficient inert heat exchanger solids such as sand to cool the reactor product to a temperature not lower than its dew point, for example, to about 600° F. The cooled reactor products are separated in heads tank 13 from the heat exchanger solids and passed to suitable recovery means. The heat exchanger solids at about 600° F. carrying a small amount of high boiling polymer deposited from the reactor products are discharged into heating chamber 23. Air and additional fuel, if necessary, are supplied to chamber 23 and burned therein to raise the temperature of the solids to the desired temperature, for example, to about 1200° F. The hot heat transfer solids, preferably after stripping with recycle gas or the like are then discharged into the upper part of heat exchanger 31 while recycle gas at about 100° F. is supplied to the bottom of the heat exchanger. Hot recycle gas at about 1200° F. or at the temperature of the hot heat transfer solids is taken overhead from the preheater and is passed to the reactor. Heat exchanger solids at substantially the temperature of the incoming recycle gas are withdrawn from the bottom of the heat exchanger and discharged into the reactor overhead product stream for recycling through the heat exchanger system.

The recycle gas normally contains about 5 mole percent of $C_4$ and heavier hydrocarbons, and these valuable gasoline constituents are susceptible to thermal degradation into less valuable gaseous components at the high temperatures to which it is desirable to heat the recycle gas from heat balance considerations. Hence it is desirable to construct the gas outlet, high temperature section of the recycle gas-solids heat exchanger 31 in such a way that the gas contact time at temperatures above about 1000° F. is a minimum, preferably less than one second. Alternatively, the $C_4$ and heavier content of the recycle gas can be reduced as by absorption or the use of lower temperatures in the recycle gas-liquid product separation step.

When operating this system with a 900° F. reactor outlet temperature, 6000 cu. ft. per barrel recycle gas rate, and heating the recycle gas from 100° F. at the inlet to 1200° F. at the outlet of the heat exchanger 31, the temperature to which the product vapors are cooled by the circulating inert heat transfer solids is set at about 620° F. by heat balance. With low boiling feed stocks, this may be appreciably above the dew point of the product vapors; for example, the dew point of the product vapors when feeding a 200–330° F. naphtha with 6000 cu. ft. per barrel of recycle gas is about 300–350° F. With such a feed stock, it is desirable to cool the product vapors to this lower temperature, but this requires an increased circulation rate of inert solids through the system and hence provides a greater heat content in the inert solids stream after heating it to 1200° F. than can be absorbed by heat transfer to the recycle gas. This can be compensated for either by reducing the temperature to which the inert solids are heated in heater vessel 23 (which, of course, reduces the temperature to which the recycle gas can be heated), or preferably, by drawing a second stream of hot inert solids from heater vessel 23 or transfer line 30 and using it to vaporize and at least partially superheat the naphtha feed stream in a separate heat exchanger vessel (not shown). This heat exchanger may provide for either direct or indirect transfer of heat from the hot solids to the naphtha stream. The cooled inert solids from this exchanger are combined with the cooled solids from heat exchanger 31 for mixing with hot product vapors in line 10 and recycling through the system.

The hydroforming reaction may be carried out in fixed or moving beds but is preferably carried out in a fluidized solids system with continuous circulation of catalyst from the reactor to a regenerator and back to the reactor. The feed or charging stock to the hydroforming reactor may be a virgin naphtha, a cracked naphtha, a Fischer-Tropsch naphtha or the like having a boiling range of about 125–450° F. or it may be a narrow-boiling cut from within this range. The feed stock to the hydroforming reactor is ordinarily preheated to about 800–1000° F., preferably about 950° F. Thermal degradation of the feed naphtha at preheat temperatures can be minimized by limiting the time of residence thereof in the transfer and feed inlet lines.

Hydrogen-rich gas or recycle gas containing about 50 to 80 volume percent hydrogen is preheated to temperatures of about 1050–1200° F. and circulated through the reaction zone at a rate of from about 1000 to 8000 cu. ft. per barrel of naphtha feed.

The reactor system is charged with a hydroforming catalyst containing a group VI metal oxide such as molybdenum oxide, chromium oxide, tungsten oxide or vanadium oxide or mixtures thereof preferably dispersed upon a support or carrier such as activated alumina, zinc aluminate spinel or the like. Preferred catalyst contain about 5 to 15 wt. percent molybdenum oxide or from about 10 to 40 wt. percent chromium oxide upon a suitable carrier. If desired minor amounts of stabilizers and promoters such as silica, calcium, ceria or potassia can be included in the catalyst. In fluidized solids operations the catalyst particles are, for the most part, between 200 and 400 mesh in size or about 0-200 microns in diameter with a major proportion between 20 and 80 microns.

The hydroforming reactor is operated at temperatures between about 850 and 950° F. and at pressures of from about 50 to about 500 lbs. per sq. inch. Small amounts of water vapor are present in the reaction zone, due principally to the presence of water in the feed and in the recycle gas and also due to the formation of water in the regeneration of the spent catalyst as well as the reduction of the regenerated catalyst in a separate pretreater or in the reactor vessel itself. The presence of these small amounts of water permits operation of the reactor at somewhat higher temperatures without loss in selectivity than is possible in systems lacking this small water partial pressure.

Regeneration of spent reactor catalyst is effected at substantially the same pressure as is maintained in the hydroforming reaction zone and at temperatures of about 1050-1200° F. The average residence time of the catalyst in the reactor is from about 3 to 4 hours while the average residence time of the catalyst in the regenerator is from about 5 minutes to one hour.

The weight ratio of catalyst to oil introduced into the reactor is about 0.5 to 5.0. It is ordinarily preferred to operate at catalyst to oil ratios of about 1.0 since higher ratios tend to give excessive carbon formation. Somewhat higher weight ratios can be used at higher pressures.

The space velocity or the weight in pounds of feed charged per hour per pound of catalyst in the reactor depends upon the age or activity level of the catalyst, the nature of the feed stock and the desired octane number of the product. Space velocity for a molybdenum oxide upon alumina gel catalyst may vary, for example, from about 1.5 w./hr./w. to about 0.15 w./hr./w.

The foregoing description contains a limited number of embodiments of the present invention. It will be understood, however, that numerous variations are possible without departing from the scope or spirit of this invention.

What is claimed is:
1. A method of recovering sensible heat from a hot vaporous reactor overhead product stream which comprises mixing the reactor overhead product stream with cool, inert, heat exchange solids in an amount sufficient to at most cool the reactor overhead product stream to its dew point, separating the cooled reactor overhead product from the inert heat exchange solids, further heating the inert heat exchange solids, contacting the hot, heat exchange solids countercurrently with a reactor feed stream to preheat the feed stream to above the temperature of the reactor and to cool the inert heat exchange solids to the temperature of the feed stream and recycling the cool, inert heat exchange solids to said mixing step.

2. A method of recovering sensible heat from a hot vaporous reactor overhead product stream which comprises mixing the reactor overhead product stream with cool, inert, heat exchange solids in an amount sufficient to at most cool the reactor overhead product stream to its dew point, separating the cooled reactor overhead product from the inert heat exchange solids, further heating the inert heat exchange solids by indirect heat exchange with hot gases and/or solids, contacting the hot, heat exchange solids countercurrently with a reactor feed stream to preheat the feed stream to above the temperature of the reactor and to cool the inert heat exchange solids to the temperature of the feed stream and recycling the cool, inert heat exchange solids to said mixing step.

3. A method of recovering sensible heat from a hot vaporous reactor overhead product stream which comprises mixing the reactor overhead product stream with cool, inert, heat exchange solids in an amount sufficient to at most cool the reactor overhead product stream to its dew point, separating the cooled reactor overhead product from the inert heat exchange solids, further heating the inert heat exchange solids by burning combustible materials in direct contact with said solids, contacting the hot, heat exchange solids countercurrently with a reactor feed stream to preheat the feed stream to above the temperature of the reactor and to cool the inert heat exchange solids to the temperature of the feed stream and recycling the cool, inert heat exchange solids to said mixing step.

4. A method of recovering sensible heat from a hot vaporous reactor overhead product stream which comprises mixing the reactor overhead product stream with cool, inert, heat exchange solids in an amount sufficient to at most cool the reactor overhead product stream to its dew point, separating the cooled reactor overhead product from the inert heat exchange solids, heating the inert heat exchange solids to temperatures of about 1100-1250° F. by burning combustible materials in direct contact with said solids, contacting the hot, heat exchange solids countercurrently with a stream of hydrogen-rich recycle gas to preheat the recycle gas to about 1100-1200° F. for introduction into a reforming reaction zone and to cool the inert heat exchange solids to the temperature of the recycle gas and recycling the cool, inert heat exchange solids to said mixing step.

5. The process as defined in claim 3 wherein a small amount of the highest boiling constituents of the product stream is condensed on the heat exchange solids in the cooling step and is burned off the heat exchange solids in the solids heating step.

6. The process as defined in claim 4 wherein a small amount of the highest boiling constituents of the product stream is condensed on the heat exchange solids in the cooling step and is burned off the heat exchange solids in the solids heating step.

References Cited in the file of this patent

UNITED STATES PATENTS

| | | |
|---|---|---|
| 2,376,190 | Roetheli et al. | May 15, 1945 |
| 2,443,210 | Upham | June 15, 1948 |
| 2,459,836 | Murphree | Jan. 25, 1949 |
| 2,551,905 | Robinson | May 8, 1951 |
| 2,614,028 | Schaumann | Oct. 14, 1952 |
| 2,663,676 | Cardwell et al. | Dec. 22, 1953 |
| 2,665,239 | Howard et al. | Jan. 5, 1954 |
| 2,675,294 | Keith | Apr. 13, 1954 |
| 2,762,753 | Rich et al. | Sept. 11, 1956 |